Patented Oct. 28, 1952

2,615,874

UNITED STATES PATENT OFFICE 2,615,874

COPOLYMERS OF VINYLIDENE CYANIDE AND PROPYLENE

Harry Gilbert, Cuyahoga Falls, and Floyd F. Miller, Akron, Ohio, assignors to The B. F. Goodrich Company, New York, N. Y., a corporation of New York No Drawing. Application August 25, 1950, Serial No. 181,562

5 Claims. (Cl. 260—78.5)

This invention relates to the preparation of novel copolymers of vinylidene cyanide and propylene, which copolymers are extremely useful in the preparation of filaments and films and other plastic materials.

In U. S. Patents 2,476,270 and 2,502,412 to Alan E. Ardis, and 2,514,387 to Harry Gilbert, novel methods for the preparation of monomeric vinylidene cyanide are disclosed. In a copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0 to 9.7° C. depending on purity with purest samples melting at 9.0 to 9.7° C. and it boils at 40° C. at reduced pressure of 5 millimeters of mercury. It is quite unstable because of its extreme sensitivity to water, undergoing on contact with water at room temperature an instantaneous homopolymerization reaction to give a solid water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with propylene in the presence of a free radical catalyst to give new and useful copolymers.

It has also been discovered that when polymerization is carried out in such manner that the charge contains from 5 to 95 mole percent of monomeric vinylidene cyanide, the copolymers obtained are essentially 1:1 alternating copolymers, that is, copolymers possessing the structure:

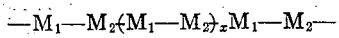

wherein each $M_1$ is a vinylidene cyanide unit

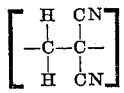

each $M_2$ is a unit of propylene

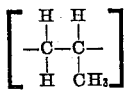

and $x$ is any number, preferably from 200 to 16,000. The fact that the copolymers obtained when this vinylidene cyanide charging ratio is utilized are essentially 1:1 alternating copolymers is determined by analysis of the copolymer and by the following copolymerization equation of F. N. Lewis, C. Walling et al., Journal of the American Chemical Society, 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein $(M_1)$ = concentration of unreacted monomer $M_1$
$(M_2)$ = concentration of unreacted monomer $M_2$
$r_1$ = ratio of the rate constants for the reaction of an $M_1$ type radical with $M_1$ and $M_2$ respectively
$r_2$ = ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to zero, a 1:1 alternating copolymer is formed, that is a copolymer having the

structure shown hereinabove for the copolymers of vinylidene cyanide with propylene. It has been found that the product of $r_1$ and $r_2$ as determined for the vinylidene cyanide-propylene copolymer system is substantially zero, thus demonstrating that the copolymers possess the essentially 1:1 alternating structure herein described. Further evidence that the copolymers possess the 1:1 alternating structure is found in the fact that by nitrogen analysis the copolymers are determined to contain approximately 50 mole per cent vinylidene cyanide.

It is highly surprising that vinylidene cyanide will polymerize with propylene to give 1:1 alternating copolymers since almost without exception monomer pairs exhibit a very strong tendency to polymerize randomly, as is the case in the present invention when the charge contains less than 5 or more than 90 mole per cent of vinylidene cyanide. For example, ethylene, the next lower homologue of propylene, polymerizes randomly with vinylidene cyanide regardless of the molar charging ratio of the two monomers.

In carrying out the present polymerization process the vinylidene cyanide and catalyst are preferably placed in a pressure vessel together with an inert solvent or diluent such as benzene, toluene, trichlorobenzene, or the like and propylene is charged under a pressure of from about 100 to 300 pounds per square inch into the vessel from a suitable storage cylinder. The pressure vessel is then heated to a temperature of about 20° C. to 100° C. and preferably at about 30 to 50° C. Heating is continued until the copolymerization reaction has reached the desired conversion. The bomb is then vented to the atmosphere, cooled and the copolymer removed by filtering or by other methods known to those skilled in the art. Alternatively, the polymerization can be carried out without the use of a solvent or diluent, although the polymerization is somewhat slower by this procedure. Also, if desired, the polymerization can be carried out in a semi-continuous or continuous manner.

It is to be understood, of course, that regardless of the polymerization method utilized, the polymerization should be stopped before either of the monomers is entirely consumed in order that an essentially 1:1 alternating copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment.

The catalyst which is used in the polymerization process is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide and the like. In general, from 0.01 to 1% by weight of the catalyst based on the monomers, is utilized although smaller or larger amounts may be utilized if desired.

The following examples illustrate the preparation of copolymers of vinylidene cyanide and propylene in accordance with this invention, but are not to be construed as a limitation upon the scope thereof, for there are of course, numerous possible variations and modifications. In the examples all parts are by weight.

Example I

Four parts (7.5 mole per cent) of vinylidene cyanide, 22 parts benzene and 0.048 part of o,o'-dichlorobenzoyl peroxide are charged into a glass lined steel reaction bomb. The bomb is sealed and purged with nitrogen, propylene is added to the bomb from a storage cylinder until a total of 26 parts of propylene have been added and the bomb is then placed in a water bath maintained at a temperature of 43° C. Heating of the bomb is continued for a period of 20 hours after which the bomb is removed from the bath, vented and cooled. Upon filtering of the contents of the bomb, the vinylidene cyanide propylene copolymer formed by the polymerization is recovered as a finely-divided hard resinous heat-softenable solid. By analysis of the copolymer it is determined that it contains 24.4% nitrogen or 53.5 mole per cent of vinylidene cyanide and is therefore a 1:1 alternating copolymer. The copolymer does not dissolve in aqueous alkali solution.

Example II

Example I is repeated utilizing 7.8 parts vinylidene cyanide (42.5 mole per cent), 44 parts benzene and 0.012 part o,o'-dichlorobenzoyl peroxide. Six parts of propylene are added to this mixture. The copolymer obtained is similar to that obtained in Example I and is found to contain 52.1 mole per cent vinylidene cyanide.

Example III

Example I is again repeated utilizing 5, 30, 70 and 95 mole per cent of vinylidene cyanide respectively. In each case the resulting copolymer contains from 48 to 52 mole per cent vinylidene cyanide, thus demonstrating that the copolymers possess the essentially 1:1 alternating structure.

When the polymerization is carried out at other temperatures in the range of 20° C. to 100° C. or higher or lower, or utilizing other of the peroxygen catalysts disclosed hereinabove, substantially equivalent results are again achieved.

The copolymers which are prepared according to this invention are characterized by being soluble in dimethyl formamide, hot cyclohexanone, and in a mixture of dimethyl formamide and acetone. They are insoluble in acetone alone, alcohol, benzene and ethers.

As disclosed hereinabove, the copolymers of this invention are valuable in the preparation of solutions from which can be spun filaments of any desired size and which exhibit a crystalline pattern when examined by X-rays and which in addition possess high tensile strength, excellent resistance to the action of alkalis and acids, as well as many other advantageous properties. Also, since the copolymers of this invention are characterized by having a definite softening point, they may be melt spun, cast into excellent films, or molded into various shaped objects.

Although specific examples of the invention have been herein described, it is not intended to limit the invention solely thereto, but to include all of the variations and modifications falling within the spirit and scope of the appended claims.

We claim:

1. A copolymer of monomeric vinylidene cyanide and propylene possessing essentially the structure

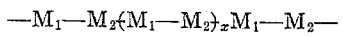

wherein each $M_1$ represents the vinylidene cyanide unit of the structure

and each $M_2$ represents the propylene unit of the structure

and $x$ represents a number, said copolymer being a resinous heat-softenable solid which is soluble at room temperature in dimethyl formamide but which is insoluble at room temperature in each of alcohol, benzene and ether, and the monomeric vinylidene cyanide entering into said copolymer to produce the vinylidene cyanide units being a liquid at room temperature and a crystalline solid at 0° C. having a melting point when in purest form of substantially 9.0 to 9.7° C. and being characterizable chemically by the ability to undergo on contact with water at room temperature an instantaneous homopolymerization reaction to give a solid water-insoluble resin and by the ability to react at room temperature with butadiene-1,3 to give solid 4,4-dicyanocyclohexene.

2. The method which comprises preparing a liquid medium containing liquid monomeric vinylidene cyanide, said monomeric vinylidene cyanide being characteristic chemically by the ability to undergo on contact with water at room temperature an instantaneous homopolymerization reaction to give a solid water-insoluble resin, admixing said liquid medium with propylene in an amount such that the mixture contains 5 to 95 mole per cent monomeric vinylidene cyanide and with a peroxygen catalyst in an amount from 0.01 to 1% by weight based on the monomeric vinylidene cyanide, and maintaining the resulting mixture at a temperature of 20 to 100° C. and at a pressure such as to prevent escape of gases, thereby to form a solid resinous copolymer of propylene and vinylidene cyanide possessing essentially the structure $$-M_1-M_2(M_1-M_2)_xM_1-M_2-$$

wherein each $M_1$ represents the vinylidene cyanide unit of the structure

and each $M_2$ represents the propylene unit of the structure

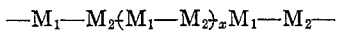

and $x$ represents a number.

3. The method of claim 2 wherein the liquid medium containing monomeric vinylidene cyanide consists of monomeric vinylidene cyanide dissolved in an organic solvent which is inert thereto.

4. The method of claim 3 wherein the organic solvent is a liquid hydrocarbon.

5. The method of claim 3 wherein the liquid hydrocarbon solvent is benzene and the peroxygen catalyst is o,o'-dichlorobenzoyl peroxide.

HARRY GILBERT.
FLOYD F. MILLER.

REFERENCES CITED

The following references are of record in the file of this patent:

UNITED STATES PATENTS

| Number | Name | Date |
| --- | --- | --- |
| 2,396,785 | Hanford | Mar. 19, 1946 |
| 2,466,395 | Dickey | Apr. 5, 1949 |
| 2,467,234 | Sargent | Apr. 12, 1949 |